United States Patent
Baxter et al.

(10) Patent No.: US 9,332,855 B2
(45) Date of Patent: May 10, 2016

(54) PERSONAL CELLULAR TISSUE REPAIR, RECOVERY AND REGENERATION ENHANCEMENT SLEEP SYSTEM

(71) Applicants: John Robert Baxter, Winter Park, FL (US); Robert Gregory Carder, Winter Park, FL (US)

(72) Inventors: John Robert Baxter, Winter Park, FL (US); Robert Gregory Carder, Winter Park, FL (US)

(*) Notice: Subject to any disclaimer, the term of this patent is extended or adjusted under 35 U.S.C. 154(b) by 127 days.

(21) Appl. No.: 14/208,985

(22) Filed: Mar. 13, 2014

(65) Prior Publication Data

US 2015/0257543 A1   Sep. 17, 2015

(51) Int. Cl.

| A47G 9/00 | (2006.01) |
|---|---|
| A47C 27/00 | (2006.01) |
| A47G 9/02 | (2006.01) |
| A47G 9/04 | (2006.01) |
| B32B 5/26 | (2006.01) |
| A47C 27/08 | (2006.01) |
| A47C 31/00 | (2006.01) |
| B32B 7/08 | (2006.01) |

(52) U.S. Cl.
CPC ............ *A47C 27/002* (2013.01); *A47C 27/082* (2013.01); *A47C 31/007* (2013.01); *A47G 9/007* (2013.01); *A47G 9/0246* (2013.01); *A47G 9/04* (2013.01); *B32B 5/26* (2013.01); *B32B 7/08* (2013.01); *B32B 2262/103* (2013.01); *B32B 2307/202* (2013.01); *B32B 2307/54* (2013.01); *B32B 2307/7248* (2013.01); *B32B 2457/00* (2013.01)

(58) Field of Classification Search
CPC ...................................................... A47G 9/00

USPC ...................... 5/484, 501, 710–713
See application file for complete search history.

(56) References Cited

U.S. PATENT DOCUMENTS

| 620,679 A | 3/1899 | Shryock |
|---|---|---|
| 1,607,140 A | 11/1926 | Yoek |
| 3,211,153 A | 10/1965 | Gambetti |
| 5,448,840 A | 9/1995 | Cheskin |
| 5,709,870 A | 1/1998 | Yoshimura et al. |
| 5,715,536 A | 2/1998 | Banks |
| 6,210,771 B1 | 4/2001 | Post et al. |
| 6,804,848 B1 * | 10/2004 | Rose ............... A47C 27/082 5/706 |
| 6,821,936 B2 | 11/2004 | Green et al. |
| 7,814,623 B2 | 10/2010 | Palmer et al. |
| 8,394,296 B2 | 3/2013 | Park et al. |
| 8,414,659 B2 | 4/2013 | Tsai |
| 2004/0098064 A1 * | 5/2004 | O'Kelly ............... A61N 1/205 607/48 |
| 2005/0106390 A1 | 5/2005 | Foss et al. |
| 2005/0214501 A1 | 9/2005 | Baychar |
| 2005/0229328 A1 | 10/2005 | Tran |

(Continued)

*Primary Examiner* — Fredrick Conley

(57) ABSTRACT

A personal cellular tissue repair, recovery, and regeneration enhancement sleep system for the augmentation of various health promoting metabolic processes associated with sleep via multifunctional stimulus-responsive polymers, performance, and responsive textiles. These textiles possessing both clinically proven and theoretical benefits to the human body including: balancing body temperature and increasing oxygen levels to skin and tissues by utilizing a blend of minerals and ingredients embedded into subject textiles; an antimicrobial, multi-layered textile incorporating specialized silver substrate yarn possessing antimicrobial, anti-odor, and conductive properties; attenuation of oxidative stress and damage to body's cells from positively charged reactive oxygen species (free radicals) via silver substrate yarn and a plurality of adjacent conductive fibers for transport of free electrons to the body from a relatively greater electrically negative potential, an electrical Ground, via the Ground potential in a standard wall outlet. All superimposed upon a mattress technology with or without air chambers.

12 Claims, 9 Drawing Sheets

(56) References Cited

U.S. PATENT DOCUMENTS

| | | |
|---|---|---|
| 2006/0177645 A1 | 8/2006 | Baychar |
| 2006/0182812 A1 | 8/2006 | Ono |
| 2006/0234903 A1* | 10/2006 | Short .................. D06M 13/192 510/526 |
| 2007/0094806 A1* | 5/2007 | Beretta ................ A47C 27/082 5/713 |
| 2007/0277323 A1* | 12/2007 | Bain ........................ A61F 5/48 5/699 |
| 2008/0202623 A1* | 8/2008 | DeAngelis ........... D06N 3/0086 139/425 R |

\* cited by examiner

PERSONAL CELLULAR TISSUE REPAIR, RECOVERY AND REGENERATION ENHANCEMENT SLEEP SYSTEM

FIELD OF THE INVENTION

The present invention relates to novel fiber materials and textile materials including such novel fiber material, having been altered utilizing Surface Modifying Systems (SMS) and embedding processes, employing a plurality of specific combinations of active particles that may be combined with carrier materials to produce fibers for use in performance textiles. Resultant compositions may interact with wave forms of energy in the visible spectrum, as well as optical and electromagnetic energy beyond the visible spectrum. These superimposed upon fabrics to create Stimulus-Responsive Polymers (responsive textiles), so called performance textiles and their subsequent applications as relating to the human body. More particularly, the present invention relates to utilization of these Stimulus-Responsive Polymer textiles (responsive textiles) performance textiles, etc., employed to interact in a benign manner with the human body, its needs, requirements and homeostatic stabilization in an enhanced sleep system for the purpose of augmenting cellular tissue repair, recovery and regeneration by deploying a diverse plurality of these textiles described herein, designed to modify the velocity, intensity and sequela of the aging process in humans.

DESCRIPTION OF THE RELATED ART

Recently, stimulus-responsive polymer fiber materials in textile and textile application have become available which appear to increase peripheral blood flow, and thereby, increase oxygenation, when such materials incorporated in textiles are in contact to trans-cutaneous tissue. Examples of such stimulus-responsive polymer fiber materials in textile and textile application are described in U.S. Pat. Nos. 7,074, 499; 8,292,970; U.S. Patent Publication No. 2006/0234903; 2009/0029614. While it's true that this current art is being employed in a standalone fashion for purposes elucidated above, its current deployment is by definition, self limited. Because the human organism exist not just as individual subsections independent of one another, but in an interdependent symphony, it is desirable to deploy art of this nature, these materials, like materials and their functionality in a more comprehensive personal cellular tissue repair, recovery and regeneration enhancement sleep system for the augmentation of metabolic processes associated with sleep via synergistic Stimulus-Responsive Polymer multifunctional performance and responsive textiles.

In times past, industry has employed various protective measures against unwanted Electrostatic Discharge (ESD). Patents surrounding the ESD facet of industry abound, even predating that of the 20$^{th}$ century, U.S. Pat. Nos. 620,679; 1,607,140 and 3,211,153 as example. Recent emerging studies building upon ESD and the bioelectric nature of human tissue provide evidence that, in addition to simple protection from ESD, conductive contact of the human frame to the ground potential of the Earth has measurable physiological impact and consequence to health. A number of patents and published patent applications discuss prior art, multifunctional performance polymer fiber materials in textile and textile application for the purpose of electrical conduction as well as conductively coupling humans to an electrical ground. Examples of such multifunctional performance polymer fiber materials in textile and textile application are described in U.S. Pat. Nos. 5,448,840; 5,715,536; 6,210,771; and 8,394, 296, each of which is incorporated herein by reference. As before, current art is deployed in a standalone fashion and can be effectively utilized with other materials, like materials and their conductive functionality, for utilization in a personal cellular tissue repair, recovery, and regeneration enhancement sleep system for the augmentation of metabolic processes associated with sleep via synergistic Stimulus-Responsive Polymer multifunctional performance and responsive textiles.

There has been a great deal of attention in recent years given to the health hazards of bacterial contamination from potential everyday exposure, the over proliferation of Anti-biotic pharmaceuticals and the rise of Anti-biotic resistant strains of pathogens. Due to their anti-microbial properties, textiles containing inorganic micro-biocidal metals such as silver have been introduced to the market. A number of patents and published patent applications discuss the integration of silver into textiles in light of, among other things, silver's anti-bacterial characteristics. Examples include U.S. Pat. Nos. 6,821,936 and 5,709,870; 7,814,623; 8,414,659 and U.S. published patent application No. 2005/0106390; 2005/0214501; 2005/0229328; 2006/0182812; and 2006/0177645; each of which is incorporated herein by reference. As stated previous, current art is deployed in a standalone fashion and can be effectively utilized with other materials, like materials and their functionality, for usage in a personal cellular tissue repair, recovery, and regeneration enhancement sleep system for the augmentation of metabolic processes associated with sleep via synergistic Stimulus-Responsive Polymer multifunctional performance and responsive textiles.

Nowhere within the prior art employs such a specific synergistic and complementary merging of the aforementioned and subsequently referenced multipurpose, stimulus responsive textiles, and performance textiles for utilization in a personal cellular tissue repair, recovery and regeneration enhancement sleep system for the augmentation of metabolic processes associated with sleep thereof been disclosed, utilized, or fairly suggested.

BACKGROUND OF THE INVENTION

Aging in mammals is universal, degenerative and appears unavoidable (Harman, Harman). However, well documented and study supported theories of aging, such as "The Free Radical Theory of Aging," as well as the hypothesized purposes of sleep (Eidelman), suggest that the age-related degradation of our bodies accompanying the passage of time may be modifiable. When looking at causative/contributing factors of mammalian aging and solutions to same, it is reasonable to look for intrinsic processes that damage intracellular components that these may be dealt with (Wanagat).

In brief, the Mitochondrial Free Radical Theory of Aging (MFRTA) proposes that organisms age (degrade along the passage of time), because the macromolecules of the body's cells accumulate damage over time by Reactive Oxygen Species (ROS) also known as Free Radicals and the body's varying ability to deal with these (Siegfried). This is based on the observed association of the rate of aging subsequent to the generation of Free Radicals (ROS) and subsequent oxidative damage (Siegfried). These ROS may be accumulated exogenously, as well as endogenously formed by different processes inclusive of even normal cellular metabolism (Sohal).

ROS spontaneously oxidize and damage macro-molecules such as Proteins, Lipids, and Nucleic Acids (Halliwell). Organisms are said to be sustaining Oxidative Stress when a deleterious imbalance exist between ROS accumulation/generation and detoxification (neutralization) of these, contributing to impeded cellular repair (Sies). Such imbalance is implicated as leading to an increase in ROS mediated damage. Unfettered ROS damage may in turn contribute to the proliferation of additional ROS initiating a runaway process of potentially life threatening result (Gaté, Jaeschke).

This is consistent with the exponential loss of cellular integrity, gradual decline in tissue function and increased mortality that characterizes aging and is likely contributed to by chronic Free Radical damage (Turrens). The proliferation of Free Radicals in high cellular amount has been associated with several age dependent human conditions, including cancer, neuro-degeneration, diabetes, chronic inflammation, and cardiovascular disease (Turrens, Miccadei, Young). The hypothesis suggest that as age related physiologic decline progresses, a threshold is reached at which the level of Free Radical accumulation combined with maladaptive Free Radical generation begins to contribute to the very damage that biologically ROS dependent pathways were genetically intended to combat (Cadenas). Oxidative stress can therefore be said to be an imbalance between the production of and detoxification [neutralization] of Free Radicals (ROS) (Sies).

As with everything in the core sciences, the MFRTA is subject to study, debate and even refutation. It's true, recent findings suggest that the proliferation of ROS and their relationship to the aging process is significantly more complex than originally thought and that ROS may not be the primary or initial cause of aging. However, it's also true that there is an observed and striking correlation of observed aging in human and co-incidental ROS proliferation and ROS-dependent alterations of cellular constituents (Cadenas, Miccadei, Young, Wanagat).

Knowing that the final outcome of cellular fate (survival or death) under oxidative stress is largely dependent upon the level of ROS exposure an organism is subject to (Ryter), therapeutic/preventative strategies should include manipulations of these factors using plan's of action such as pharmacological (prescription medication), nutritional (vitamins, minerals, anti-oxidants) and physiological (sleep and recovery). Because the accumulation of ROS is implicated in excessive or premature cell death, contributing to degenerative conditions, aging and even death of the organism (Ryter), the use of "Anti-Oxidant" strategies has been established for decades (Martin, Kruger).

Procuring exogenous anti-oxidants for purposes elucidated above, may involve the use of both supplementation (Venditti, Ghone, Greco) as well as prolonged physical conductive contact with sources of naturally occurring ROS scavengers (free electrons) (Chevalier, Ghaly, Oschman, Oschman, Sokal). These naturally occurring ROS scavengers can be made available for utilization to humans in the form of free electrons generated by the Earth (Chevalier, Oschman, Oschman), its atmosphere or another electrically negative source. For purposes of neutralizing ROS, these free electrons can then subsequently be applied across the gradient of semi-conductive human tissue (Szent-Gyorgyi, Applewhite, Oschman, Chevalier) via concurrent conductive contact with an electrical ground through a stimulus-responsive textile (Applewhite).

As humans continue to live longer and longer, an artifact of increased age is our body's immune system function becomes profoundly affected by aging, while concurrent loads on personal immunity continually increase. It is well documented that immuno-competence declines with age; that is as people age, the immune system begins to lose some of its functions and cannot respond as quickly or efficiently to stimuli. Since the immune system interacts with every organ of the body, augmentation of immunity is desirable at every stage of life and therapeutic/preventative strategies should include manipulations of these factors using plan's of action such as pharmacological (prescription medication), nutritional (vitamins, minerals, anti-oxidants) and physiological (sleep and recovery).

Because the accumulation of pathogens is implicated in excessive or premature cell death, contributing to degenerative conditions, aging and even death of the organism, the use of modern "Anti-Microbial" strategies has been established for decades. Procuring exogenous anti-microbials for purposes elucidated above, may involve the use of both medications as well as prolonged exposure to certain silver-containing material possessing anti-microbial properties (Spadaro, Berger, Berger) embedded in a stimulus-responsive textile (Becker, Simoncic, Hong). Due to its anti-bacterial properties, textiles containing silver have been introduced to the market in products such as SmartSilver by NanoHorizons, ALGIDEX, and X-STATIC. Silver also beneficially provides anti-odor protection among other traits. Silver has been shown to damage the cell membrane of bacterium leading to necrosis of bacterium cells, attenuating bacteria propagation and killing pathogenic bacteria (Jain, Harshita). Silver bacteria inhibitors have advantages of low toxicity and prolonged bacteria inhibition effect. As silver is a highly conductive metal electrically, this stimulus-responsive textile also serves as the base for the transport of free electrons from electric ground to the person.

Increased levels of oxygen in the body have been shown to aid in pain relief (Kiralp), promote faster healing (Beasley), improve sleep quality (Chowdhuri), heighten strength and athletic performance (S. Elliott), as well as increased comfort and overall well being. Since oxygen affects every part of the body, optimizing oxygen procurement via augmentation of respiration is desirable at every stage of life and therapeutic/preventative strategies should include manipulations of these factors using plan's of action such as pharmacological (prescription medication), nutritional (vitamins, minerals, anti-oxidants) and physiological (sleep and recovery). Obtaining oxygen for purposes elucidated above, may involve the use of not only normal respiration but also that of stimulus-responsive textile's ability in harnessing the ambient electromagnetic radiation emitted by human bodies (Fatma), enhancing peripheral blood flow to trans-cutaneous human tissue (Yu) and thereby, increasing oxygen profusion to the body, allowing for the supplementation of the above benefits such as enhanced wound repair (Yoyokawa).

Accordingly, as we continuously age, there exist a need for a personal cellular tissue repair, recovery, and regeneration enhancement system which assists the body in neutralizing ROS, increases oxygen levels to the skin and tissues and adversely affecting microbial cellular metabolism, inhibiting the growth of bacteria and fungi. Such a personal cellular tissue repair, recovery and regeneration enhancement system should be capable of being used while sleeping, during prolonged periods of sitting as well as being available generally to, as well as particular targeted areas of the body. There are numerous shortcomings, disadvantages and dangers to prior art as related to the pharmacological attenuation and pathogens and nutritional attenuation of ROS. In addition, there exist significant disadvantages of prior art as relating to increased oxygen availability to the skin and tissues (hyperbaric chambers/infrared sauna), such as expense barriers and the cumbersome nature of prior art's structures. In addition, there exist no prior art employing the potential synergistic and complementary nature of the aforementioned system in a singular and comprehensive system. The present invention fulfills these needs and provides related ancillary advantages.

DETAIL DESCRIPTIONS OF THE INVENTION

The embodiments set forth below represent the necessary information to enable those skilled in the art to practice the invention and exemplify the best mode of practicing the invention. Upon reading the following description in light of the accompanying drawing figures, those skilled in the art will understand the concepts of the invention and will recognize applications of said concepts not expressly addressed herein. It should be understood that these concepts and applications fall within the scope of the discourse and accompanying claims. All illustrations of the drawings are for the purpose of describing selected versions of the present invention and are not intended to limit the scope of the present invention.

The present invention delineates a fundamental method and system for provision of a personal cellular tissue repair, recovery and regeneration enhancement sleep system, and is generally directed to a system for the augmentation of various health promoting metabolic processes associated with the sleep state of a vertebrate organism, a human in particular via an apparatus for modification of the velocity, intensity, and sequela of the aging processes in said vertebrate organism. This stated purpose is accomplished via the integration of the following plurality of technologies comprising multifunctional stimulus-responsive polymers, performance, and responsive textiles placed in direct and/or field contact with the organism. These textiles, while in direct or field contact with the organism, possess both clinically proven and theoretical benefits to the human body including: a) balancing body temperature and increasing oxygen levels to skin and tissues utilizing a blend of minerals and ingredients embedded into and upon the subject textiles, b) an antimicrobial, multi-layered textile incorporating specialized silver substrate yarn possessing antimicrobial, anti-odor and conductive properties and c) attenuation of oxidative stress and damage to the body of the organism from positively charged Reactive Oxygen Species (Free Radicals) via silver substrate yarn and/or a plurality of adjacent conductive fibers for the transport of free electrons to the organism from a relatively greater negative electrical potential, an electrical ground, via the ground potential in a standard wall outlet.

With reference to the accompanying FIG. 1 through 9, the salient features of the preferred embodiments are now explained in detail.

Figure 1:
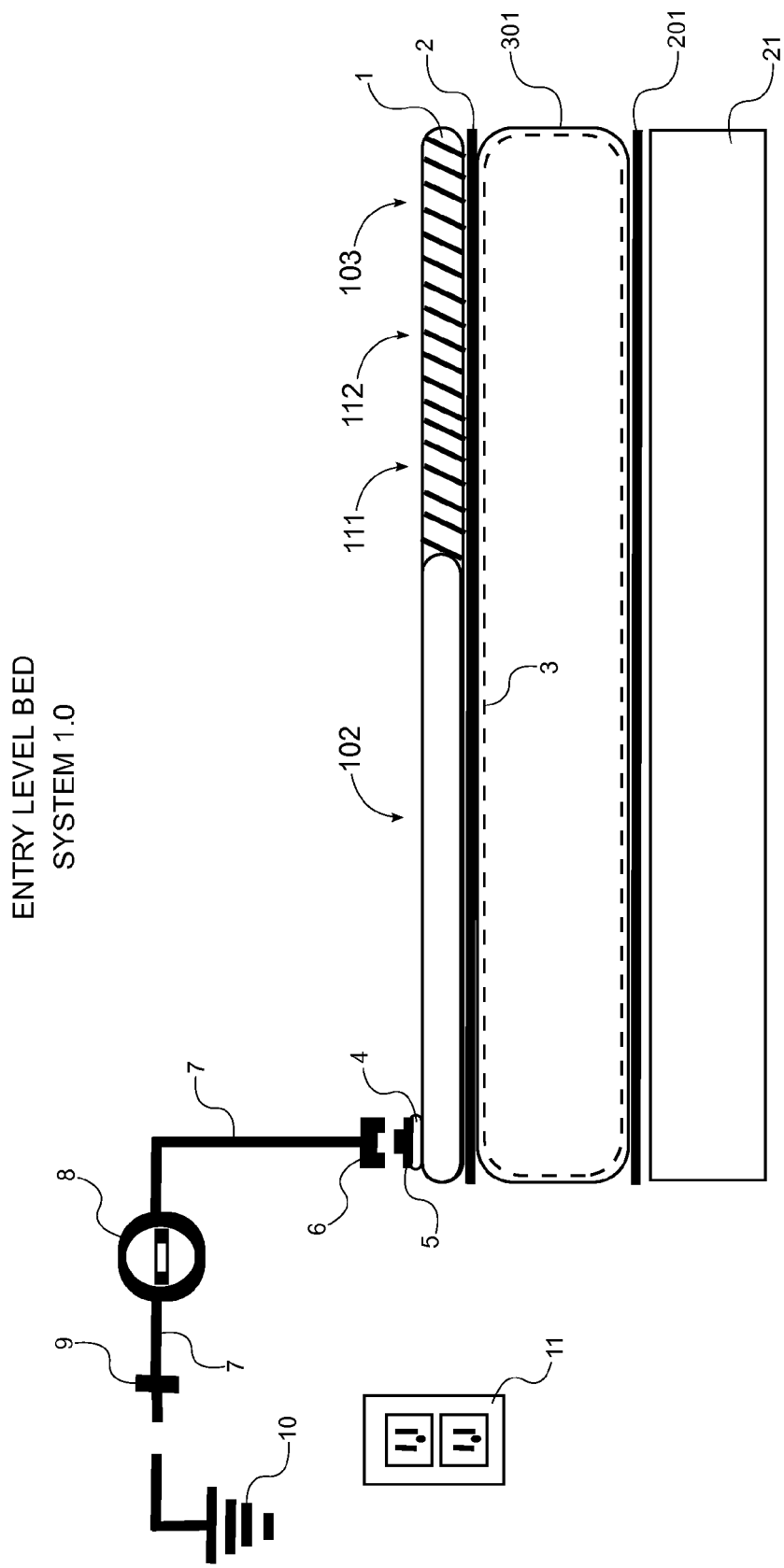
FIG. 1 is a schematic view of a personal cellular tissue repair, recovery and regeneration enhancement sleep system in a preferred embodiment of the present invention, comprising a washable, breathable, removably fastened multi-layered cover conductively connected to an electrical ground via standard wall socket and having a surge protection device superimposed between said cover and electrical ground, all removably fastened via zipper assembly atop a visco-elastic or functionally analogous mattress and mattress cover. The entirety of System is set upon an industry standard foundation, appropriate in size to that of each embodiment of the invention's variations being described herein and having specific functional variances' in accordance with and to the various teachings described herein in accordance with those particular embodiments of the invention.

The detailed recitation begins with FIG. 1, depicting a preferred embodiment of the present invention in a schematic view of a personal cellular tissue repair, recovery, and regeneration enhancement sleep system, System 1.0, embodying the present invention. The essential components of System 1.0 comprising a washable, breathable, removably fastened multilayered textile cover 1, integrally associated with a silver based fiber 112, exerting an antimicrobial effect on an organism. Multilayered textile cover 1 is conductively connected to a relatively greater negative electrical potential, an electrical ground 10, via a conductive textile 111. Said conductive textile 111, integrally associated with said multilayered textile cover 1. Said conductive textile 111, mechanically and conductively connected to electrical ground 10, via the electrical ground port in standard wall socket 11, and having an industry standard in-line fast blow fuse assembly employing an industry standard low resistance electrical device 8, that acts as a sacrificial mechanism sufficient to provide over-current protection of the vertebrate organism, in this case a human, superimposed in conductive and mechanical connection in-line between said multilayered textile cover 1, and an electrical ground 10. Multilayered textile cover 1 is integrally associated with a stimulus responsive textile, whose plurality of active particles interacts with waveforms of energy and remits beneficial energy to an organism in direct or field contact.

Said multilayered textile cover 1 is removably fastened via industry standard zipper assembly 2, to removable fabric mattress cover 301. Mattress cover 301 surrounds a visco-elastic or functionally analogous mattress 3. Embodiments of the entirety of System 1.0 may rest upon an industry standard foundation 21, appropriate in size to that of each embodiment of the system's variations being described herein and having specific functional variances in accordance with and to the various Systems described herein with those particular embodiments of the invention. The following encompasses a detailed presentation of the constituent components and purpose of said components as relating to the accompanying FIG. 2 through 9.

Figure 2:
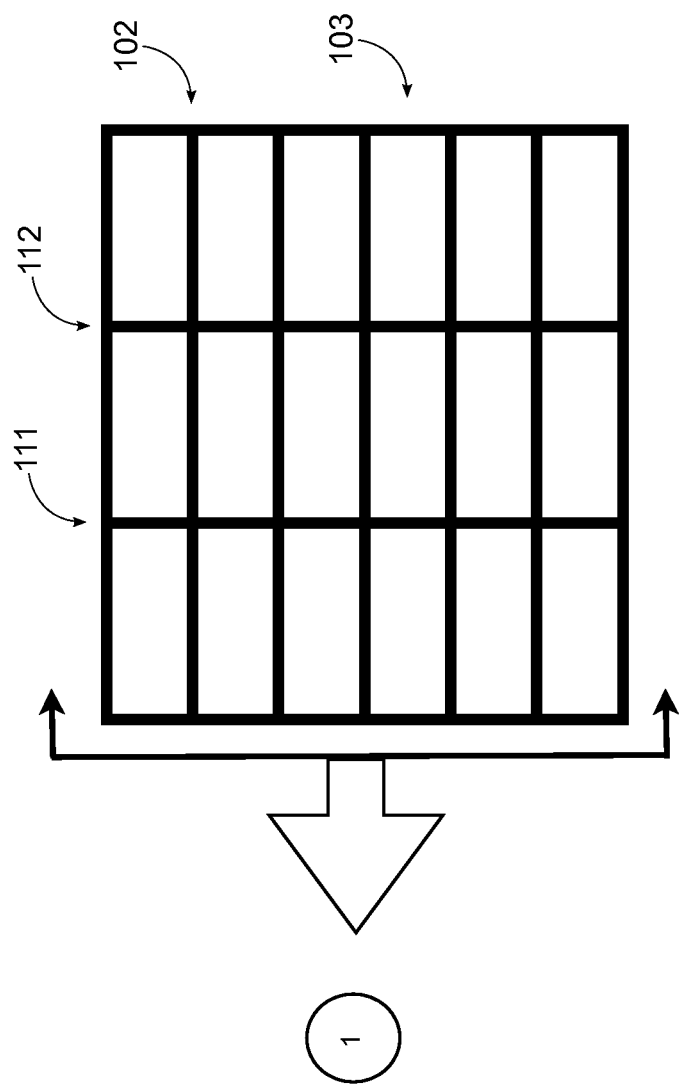
FIG. 2 is an enlarged cut away cross sectional representation of the multi-layered cover and constituent components of a preferred embodiment of the present invention.

Shown in FIG. 2 is an enlarged cut away cross-sectional view of the following areas of FIG. 1. The multilayered textile cover 1 shown in FIG. 1 illustrates a cut away cross-sectional representation of the multilayered textile cover 1 and illustrates its constituent components as follows. The conductive textile sewing thread 111 in FIG. 1 extends through a portion of the multilayered textile cover 1, sufficient for the conduction of free electrons from an electrical ground 10, to within either direct and/or field contact of the organism and said conductive thread 111, may be comprised of a diverse plurality of conductive fibers, including, but not limited to, a silver based fiber thread 112. The silver based fiber thread 112 in FIG. 1 extends through a portion of the multilayered textile cover 1, in sufficient percentage as to affect the stated antimicrobial and anti-odor properties via the release of silver ions. Silver ions so introduced to a local environment have been shown to drastically disrupt pathogenic activity within the encompassing field of the environment. The stimulus responsive textile 102 in FIG. 1 extends through a portion of the multilayered textile cover 1, deploying a plurality of photo catalytic active particles present in sufficient amount and designed to interact with waveforms of energy emitted by the body, subsequently remit energetic waveforms back to the body for the purpose of enhancing oxygen and blood flow within tissues, improving physiologic performance, recovery, and reducing physiologic fatigue. The substrate 103 for the multilayered textile cover 1 in FIG. 1 consists of a plurality of fibers.

Figure 3:
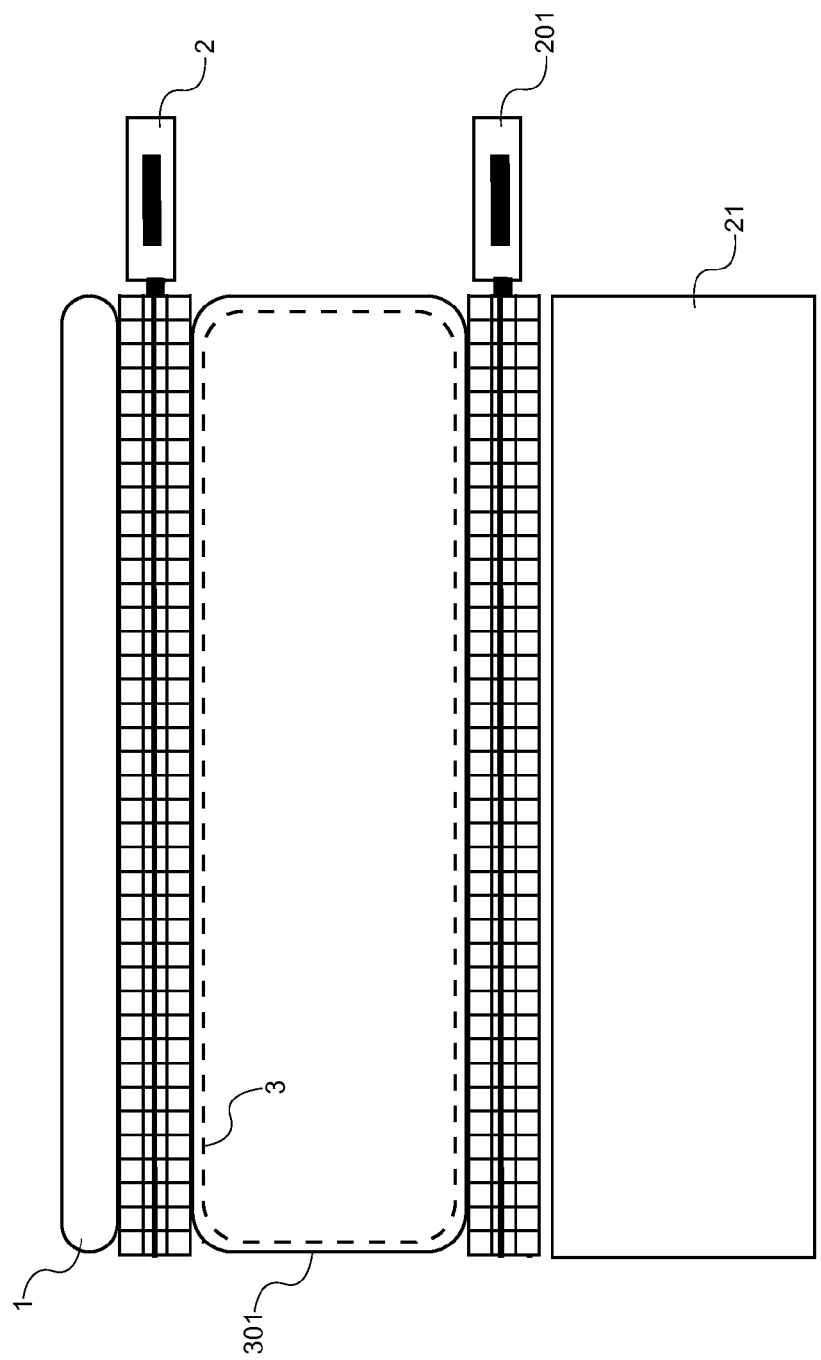
FIG. 3 is an enlarged cut-away cross sectional view of major structural components of a preferred embodiment of the present invention.

Shown in FIG. 3 is an enlarged cut-away cross sectional view of the following areas of FIG. 1. A first zipper assembly 2 in FIG. 1 illustrates an industry standard zipper assembly of sufficient tensile strength and rating as to removably fasten the multilayered textile cover 1 to the removable fabric mattress cover 301. The mattress cover 301 surrounds and encloses the mattress 3. The second zipper assembly 201 in FIG. 1 illustrates an industry standard zipper assembly of sufficient tensile strength and rating as to removably secure the removable fabric mattress cover 301 surrounding the mattress 3.

In the preferred embodiment, the mattress 3 in FIG. 1 comprises a visco-elastic foam or analogously performing material. The mattress cover 301 in FIG. 1 illustrates a representation of a removable fabric mattress cover surrounding the mattress 3. The foundation 21 in FIG. 1 is industry standard, is appropriate in size to that of each embodiment of the various Systems being described herein, and has specific functional variances with and to the various Systems described herein with the particular embodiments of the present invention.

Figure 4:
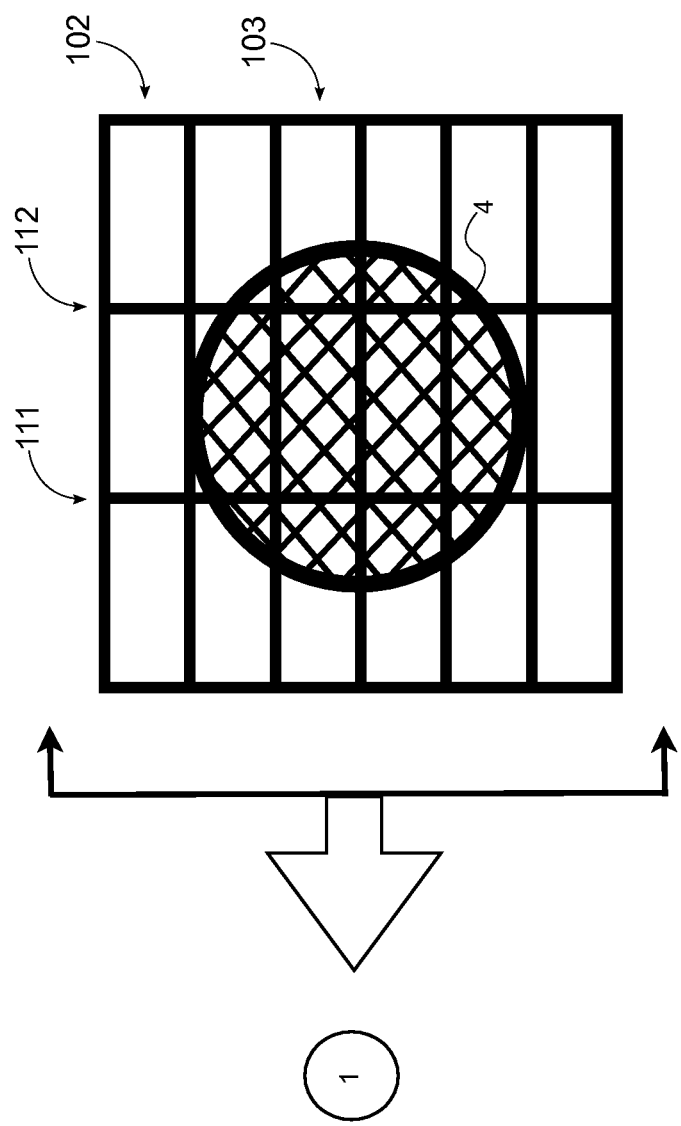
FIG. 4 is an enlarged cut away cross-sectional representation of the multi-layered cover and additional constituent components of a preferred embodiment of the present invention.

Shown in FIG. 4 is an enlarged cut away cross sectional view of the following areas of FIG. 1. In addition, FIG. 1 illustrates a cut away cross sectional representation of the multilayered textile cover 1 and its constituent components as follows. The conductive textile sewing thread 111 in FIG. 1 extends through a portion of the multilayered textile cover 1, sufficient for the conduction of free electrons from the electrical ground 10, source to within either direct and/or field contact of the organism and said conductive thread 111, may be comprised of a diverse plurality of conductive fibers, including but not limited to silver based fiber thread 112. FIG. 1 illustrates the silver based fiber thread 112 extending through a portion of the multilayered textile cover 1, in sufficient percentage as to affect the stated antimicrobial and anti-odor properties via the release of silver ions. Silver ions so introduced to a local environment have been shown to drastically disrupt pathogenic activity within the encompassing field of the environment. Furthermore, FIG. 1 illustrates a stimulus responsive textile 102 extending through a portion of the multilayered textile cover 1 and deploying a plurality of photo-catalytic active particles present in sufficient amount and designed to interact with waveforms of energy emitted by the body, subsequently remit energetic waveforms back to the body for the purpose of enhancing oxygen and blood flow within tissues, improving physiologic performance, recovery, and reducing physiologic fatigue. In addition, FIG. 1 illustrates the substrate 103 of multilayered textile cover 1 consisting of a plurality of fibers. A patch of conductive sewing thread 4 in FIG. 1 illustrates a mechanical and conductive connection to a conductive textile sewing thread 111 and a silver based fiber thread 112 of FIG. 1 and a mechanical connection with a portion of the multilayered textile cover 1, so as to be securely fastened upon and through the multilayered textile cover 1.

Figure 5:
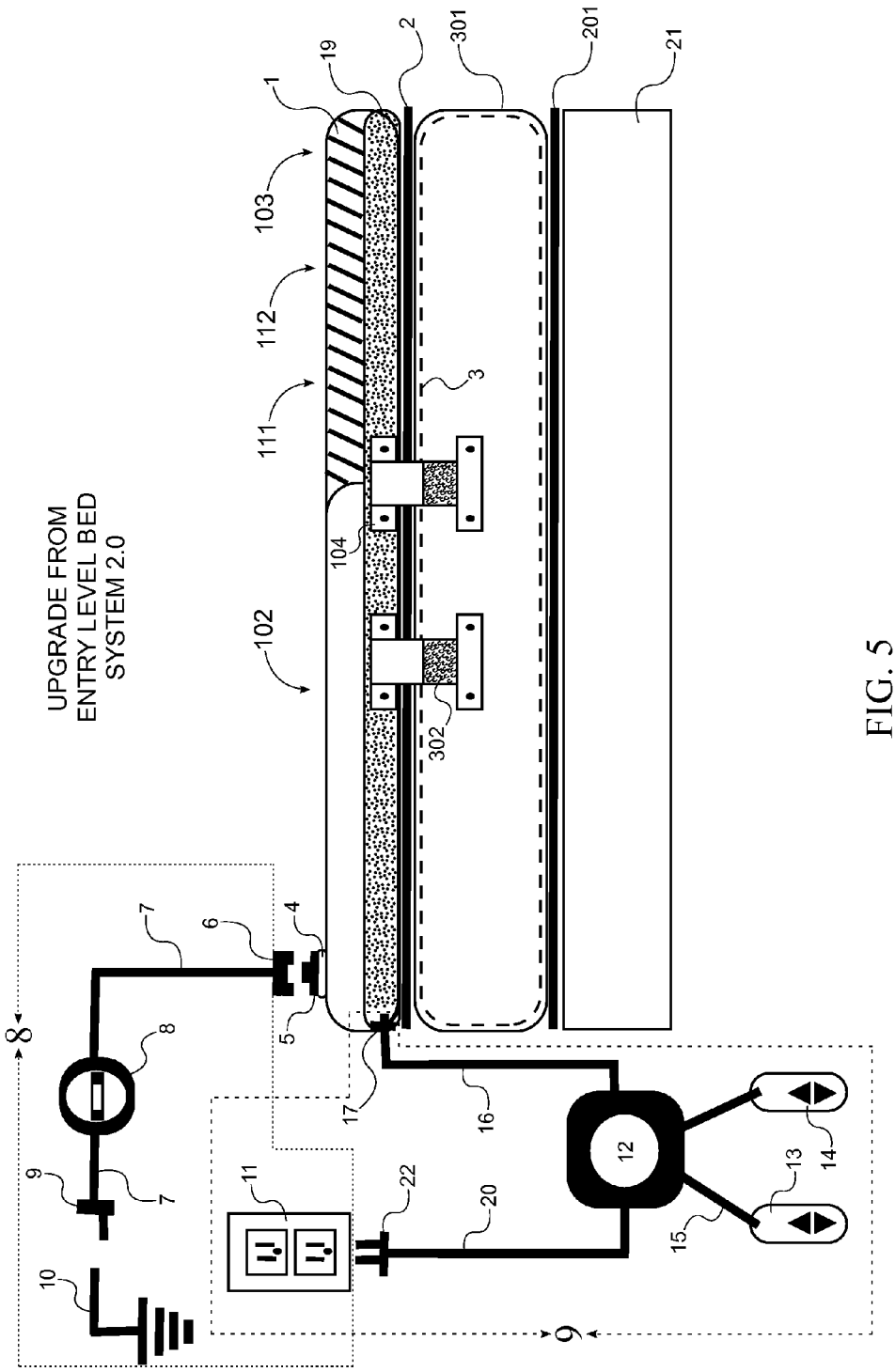
FIG. 5 is a schematic view of a personal cellular tissue repair, recovery, and regeneration enhancement sleep system in a preferred embodiment of the present invention; this preferred embodiment comprising a washable, breathable, removably fastened multi-layered cover as described in previous embodiments of the present invention and additionally housing an industry standard air chamber; the multi-layered cover being conductively connected to an electrical ground via standard wall socket and having a surge protection device superimposed between said cover and electrical ground, all removably fastened via zipper assembly atop a visco-elastic or functionally analogous mattress and mattress cover; the air chamber being mechanically connected to an air-hose assembly and air-hose to air-pump capable of manually varying inflation/deflation densities via controls, the air-pump itself being conductively connected to a standard wall outlet via industry standard wall plug and wire assembly. The entirety of this preferred embodiment up to but not including the air-pump is set upon an industry standard foundation, appropriate in size to that of each embodiment of the inventions variations being described herein and having specific functional variances' in accordance with and to the various teachings described herein in accordance with those particular embodiments of the present invention.

Shown in FIG. 5 depicting a preferred embodiment of the present invention in a schematic view of a personal cellular tissue repair, recovery and regeneration enhancement sleep system, System 2.0, embodying the present invention. The essential components of System 2.0 comprising a washable, breathable, removably fastened multilayered textile cover 1, conductively connected to an electrical ground 10, via standard wall socket 11, and having an industry standard in-line fast blow fuse assembly employing an industry standard low resistance electrical device 8, that acts as a sacrificial mechanism sufficient to provide over-current protection of the vertebrate organism, in this case a human, superimposed in conductive and mechanical connection in-line between said multilayered textile cover 1, and electrical ground 10.

In the preferred embodiment of the invention, the multilayered textile cover 1 in FIG. 5 is mechanically attached along its lateral perimeter to a quantity of an industry standard fabric handle assembly 104. Each fabric handle assembly 104 in turn affecting a secure loop assembly and by extension the resulting secure loop assembly itself in de-facto attachment to multilayered textile cover 1. The mattress cover 301 in FIG. 5 is mechanically attached to a hook-and-loop-fastening strap assembly 302. The hook-and-loop-fastening strap assembly 302 is attached to the mattress cover 301, in a number analogous to the quantity of fabric handle 104, and is attached to multilayered textile cover 1.

The multilayered textile cover 1 in FIG. 5 is removably fastened to the mattress cover 301 via a hook-and-loop-fastening strap assembly 302, and a corresponding quantity of an industry standard fabric handle assembly 104, attached to the multilayered textile cover 1, so as to effect sufficient securing of multilayered textile cover 1, to mattress cover 301, as follows: The fabric handle assembly 104 is mechanically attached to multilayered textile cover 1, affecting a secure loop assembly and allowing for the hook-and-loop-fastening strap 302 to pass under and around the industry standard fabric handle assembly 104 and to removably fasten the hook-and-loop-fastening strap 302, upon itself. Therefore, the hook-and-loop-fastening strap 302 is removably secured to the removable mattress cover 301, and by extension, its contents such as the mattress 3, to the multilayered textile cover 1. The mattress cover 301 in FIG. 5 surrounds a visco-elastic or functionally analogous mattress 3.

In various embodiments of the present invention, the multilayered textile cover 1 in FIG. 5 needs to be sufficient size in order to removably encompass and secure an air chamber 19. The air chamber 19 is a bedding-industry-standard vulcanized rubber air chamber or analogously performing air chamber of appropriate size and rating for adjusting the firmness of a one or two air chamber mattress system and appropriately accommodates each of the various embodiments of the present invention. The air chamber 19 is in fluid communication with an air-pump 12 through an air-hose assembly 17 and an air-hose 16, which allows the air-pump 12 to manually varying air pressure of the air chamber 19 via the remote controls 13 and 14. The air-pump 12 is electrically connected to a standard wall outlet 11 through the industry standard wall plug 22 and the wire assembly 20. The entirety of System 2.0, up to but not including the air-pump 12, is set upon an industry standard foundation 21, appropriate in size to that of each embodiment of the System's variations being described herein and having specific functional variances with and to the various systems described herein in accordance with those particular embodiments of the present invention.

Figure 6:
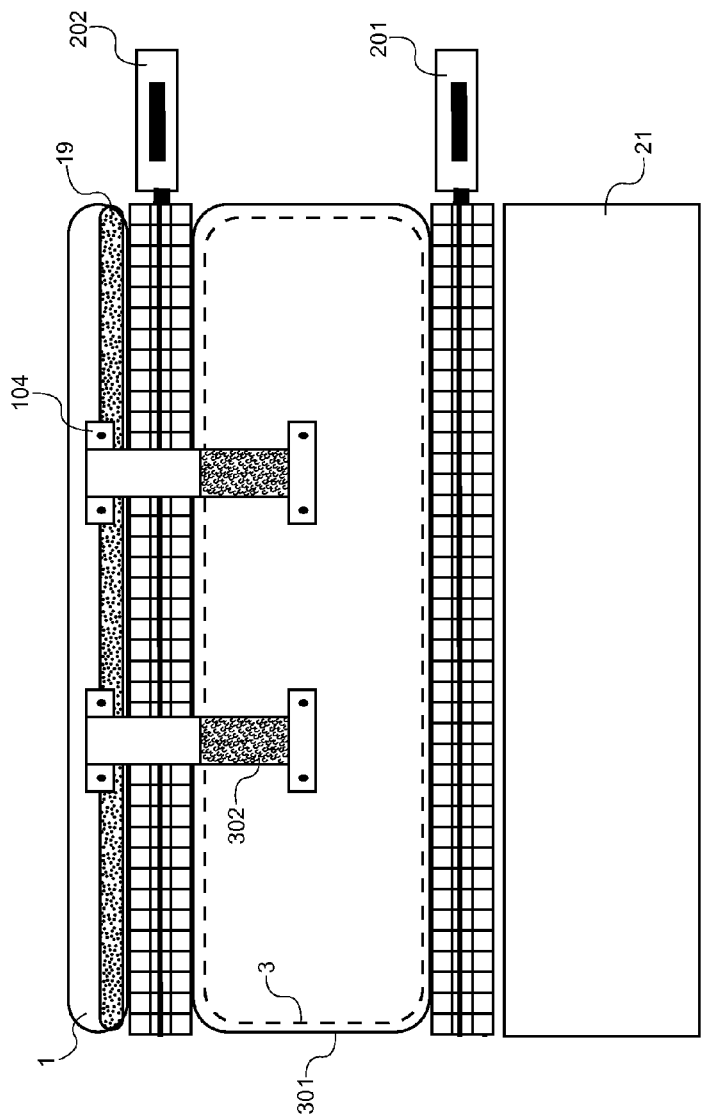
FIG. 6 is an enlarged cut-away cross sectional view of additional major and integral structural components of a preferred embodiment of the present invention.

Shown in FIG. 6 is an enlarged cut away cross-sectional view of the following areas of FIG. 5. Moreover, FIG. 5 illustrates a representation of the multilayered textile cover 1 as described in previous embodiments of the present invention, and additionally houses the industry standard air chamber 19 in FIG. 5 in accordance with the size, performance, and functionality of each embodiment of the present invention. FIG. 5 also illustrates an industry standard fabric handle assembly 104 that comprises a plurality of fibers on its ends, which are in mechanical connection to the multilayered textile cover 1. This creates a secure loop assembly and allows for the hook-and-loop-fastening strap 302 to pass under and around the industry standard fabric handle assembly 104 and to removably fasten the hook-and-loop-fastening strap 302 so that the hook-and-loop-fastening strap 302 can attach to itself and, thus, removably secures the removable mattress cover 301, and by extension, its contents such as the mattress 3, to the multilayered textile cover 1. A second zipper assembly 201 in FIG. 5 has sufficient tensile strength and rating as to removably secure the removable fabric mattress cover 301, surrounding the mattress 3. A third zipper assembly 202 in FIG. 5 has sufficient tensile strength and rating as to removably secure the removable industry standard air chamber 19 within the multilayered textile cover 1. In addition, FIG. 5 illustrates a representation of a mattress 3 comprising a visco-elastic foam or analogously performing material. FIG. 5 also illustrates a representation of a removable fabric mattress cover 301 surrounding the mattress 3. Furthermore, FIG. 5 illustrates a representation of an industry standard hook-and-loop-fastening strap assembly 302 that is mechanically connected to the mattress cover 301 and that has a sufficient length, width, and tensile strength allowing for the hook-and-loop-fastening strap assembly 302 to pass under and around an industry standard fabric handle 104 and to removably fasten the hook-and-loop-fastening strap assembly 302 upon itself. This allows the hook-and-loop-fastening strap assembly 302 to removably secure the removable mattress cover 301, and by extension, its contents such as the mattress 3, to the multilayered textile cover 1. An industry standard air chamber 19 in FIG. 5 has sufficient tensile strength, density, and function to allow for the mechanically variable inflation and deflation of same, all housed within the multilayered textile cover 1.

FIG. 5 illustrates a bedding and mattress industry standard foundation 21 or adjustable bed base, appropriate in size to that of each embodiment of the various System's being described herein and having specific functional variances' in accordance with and to the various Systems described herein in accordance with the particular embodiments of the present invention.

Figure 7B:
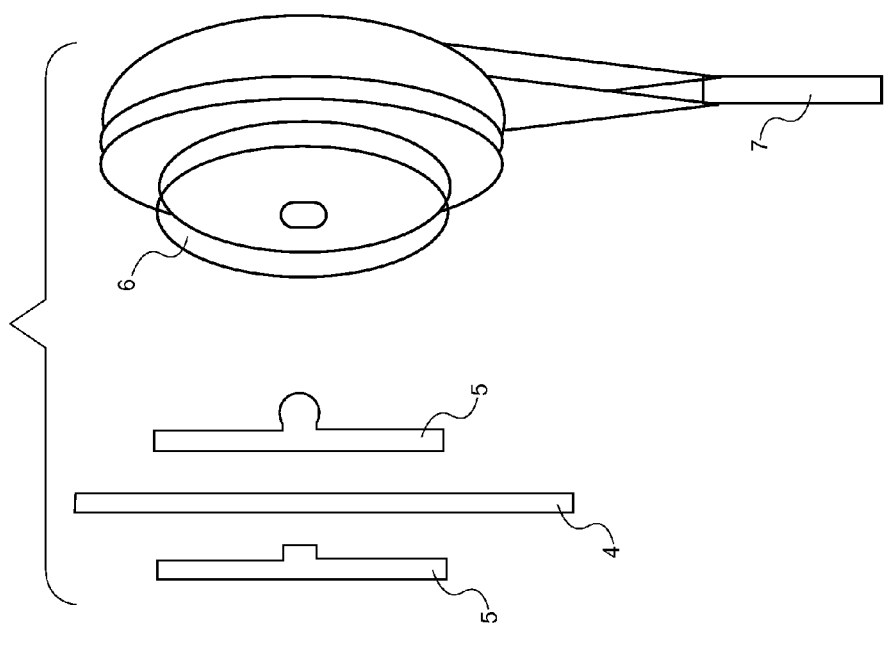
FIG. 7B is an exploded cut away cross sectional representation of the multi-layered cover and additional constituent components of a preferred embodiment of the present invention and a removably attachable insulated conductive connector of a preferred embodiment of the present invention
Figure 7A:
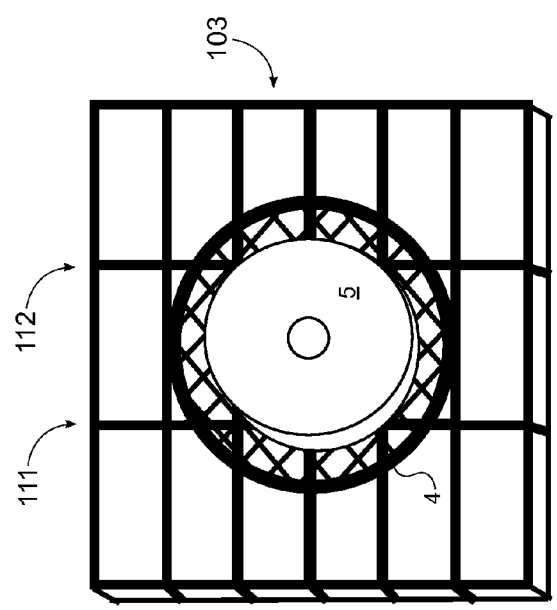
FIG. 7A is an enlarged cut away cross sectional representation of the multi-layered cover and additional constituent components of a preferred embodiment of the present invention and a removably attachable insulated conductive connector of a preferred embodiment of the present invention.

Shown in FIG. 7 is an enlarged and perspective view of the following areas of FIG. 1. A conductive textile thread 111 in FIG. 1 extends through a portion of the multilayered textile cover 1, sufficient for the conduction of free electrons from the electrical ground 10, sourced to within either direct or field contact of the organism and the conductive textile thread 111, which comprises different kinds of conductive fibers such as, but not limited to, the silver based fiber thread 112. FIG. 1 illustrates a silver based fiber thread 112 extending through a portion of the multilayered textile cover 1 in sufficient percentage as to affect the stated antimicrobial and anti-odor properties through the release of silver ions. Silver ions introduced to a local environment have been shown to drastically disrupt pathogenic activity within the encompassing field of the environment. FIG. 1 illustrates the substrate 103 of the multilayered textile cover 1 consisting of a plurality of fibers. FIG. 1 illustrates a patch of conductive sewing thread 4 in conductive connection to a conductive textile thread 111 and a silver-based fiber thread 112 and in mechanical connection with a portion of the multilayered textile cover 1, so as to be securely fastened upon and through the multilayered textile cover 1. In addition, FIG. 1 illustrates the male end 5 of an industry standard electrically conductive rivet, commonly deployed in the electro-static discharge (ESD) industry. The male end 5 of the electrically conductive rivet is mechanically and conductively connected to and through a patch of conductive sewing thread 4.

FIG. 1 illustrates the female end 6 of an industry standard electrically conductive rivet, commonly deployed in the ESD industry, conductively and mechanically connectable to and detachable from the male end 5 of an industry standard electrically conductive rivet and is conductively, mechanically, and selectively connected and insulated by an industry standard electrically conductive insulated wire 7.

Moreover, FIG. 1 illustrates an industry standard electrically conductive insulated wire 7, commonly deployed in the ESD industry, that is conductively and mechanically connected to the female end 6 of an industry standard electrically conductive rivet, as well as conductively and mechanically connected to and through an in-line fast blow fuse assembly employing an industry standard low resistance electrical device 8. The low resistance electrical device 8 acts as a sacrificial mechanism sufficient to provide over-current protection of the vertebrate organism, in this case a human.

Figure 8:
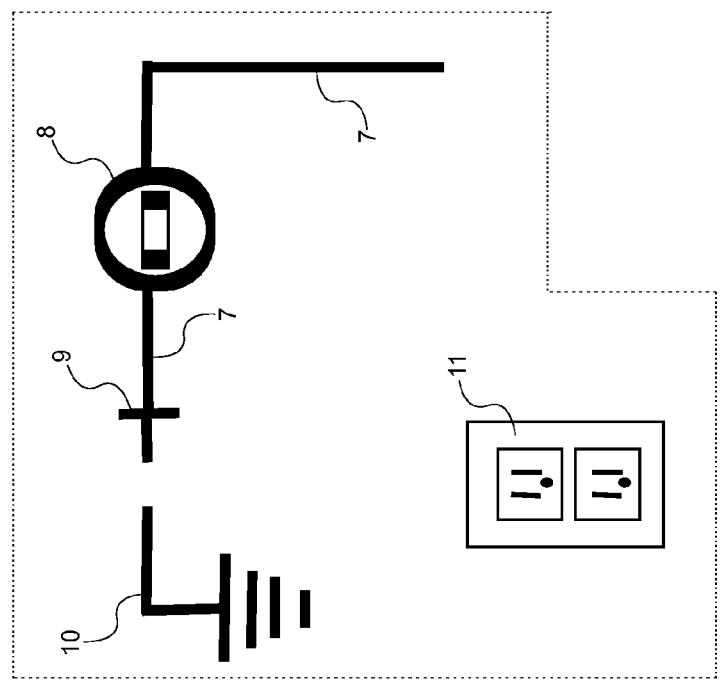
FIG. 8 is an enlarged and schematic representation of the wire and surge protector assembly of a preferred embodiment of the present invention, wherein FIG. 8 corresponds to a section in FIG. 5.

Shown in FIG. 8 is an enlarged and perspective view of the following areas of FIG. 1. FIG. 1 illustrates an industry standard electrically conductive insulated wire 7, commonly deployed in the ESD industry, that is conductively and mechanically connected to the female end 6 of an industry standard electrically conductive rivet, as well as conductively and mechanically connected to and through an industry standard in-line fast blow fuse assembly employing an industry standard low resistance electrical device 8. The low resistance electrical device 8 acts as a sacrificial mechanism sufficient to provide over-current protection of the vertebrate organism, in this case a human, and is commonly deployed in the home electronics industry. The low resistance electrical device 8 is conductively and mechanically connected in-line to the electrically conductive insulated wire 7, as well as conductively and mechanically connected in-line to only the electrical ground prong of an industry standard wall plug 9, which is commonly deployed in the ESD industry and/or home electronics industry. FIG. 1 illustrates an industry standard wall plug 9 commonly deployed in the ESD industry and/or home electronics industry, that is conductively and mechanically connected to the electrically conductive insulated wire 7 and is conductively and mechanically removably connected to only the electrical ground 10 of a standard wall outlet 11. In addition, FIG. 1 illustrates any electrical ground 10. Furthermore, FIG. 1 illustrates a standard wall outlet 11 that is mechanically and conductively connected to an electric ground 10.

Figure 9:
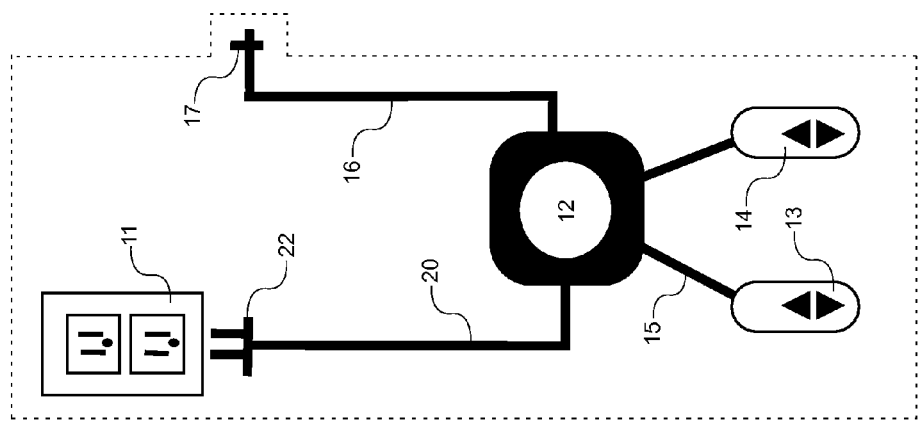
FIG. 9 is an enlarged and schematic representation of the air-pump assembly of a preferred embodiment of the present invention, wherein the FIG. 9 corresponds to a section FIG. 5.

Shown in FIG. 9 is an enlarged and perspective view of the following areas of FIG. 5. Moreover, FIG. 5 illustrates an industry standard air-hose receptacle attachment 17 that is mechanically attached in order to create an air-tight seal to and with the air-chamber 19 and the air-hose assembly 16. FIG. 5 illustrates an industry standard air-hose assembly 16 is mechanically attached in order to create an air-tight connection to and with the air-chamber 19 and the air-pump 12. FIG. 5 illustrates an industry standard air-pump system 12 having sufficient strength, durability, and functionality as to inflate and deflate and thereby adjusting the firmness of an industry standard one or two air-chamber mattress system 19 via air-hose assembly 16. FIG. 5 illustrates an industry standard wire assembly 15 in mechanical and conductive connection with the air-pump 12 and the remote controls 13 and 14. FIG. 5 illustrates industry standard remote controls 13 and 14 that may be wired to the air-pump 12 via wire assembly 15 or in segregate embodiments be in wireless connection to air-pump 12. FIG. 5 illustrates an industry standard wire assembly 20 in mechanical and conductive connection to the air-pump 12 and the standard wall plug 22. FIG. 5 illustrates a standard wall plug 22 in mechanical and conductive connection to the air-pump 12.

Although the invention has been explained in relation to its preferred embodiment, it is to be understood that many other possible modifications and variations can be made without departing from the spirit and scope of the invention as hereinafter claimed.

What is claimed is:

1. A sleep enhancement bed system comprises:
   a multilayered textile cover;
   a patch of conductive sewing threads;
   an electrically conductive rivet;
   an insulated wire;
   a removable mattress cover;
   a mattress;
   said multilayered textile cover comprises a stimulus responsive textile, a substrate, a plurality of conductive textile sewing threads, and a plurality of silver based fibrous threads;
   said electrically conductive rivet comprises a male end and a female end;
   said stimulus responsive textile being evenly distributed through said substrate;
   said plurality of conductive textile sewing threads being evenly distributed through said substrate;
   said plurality of silver based fibrous threads being evenly distributed through said substrate;
   said plurality of conductive textile sewing threads and said plurality of silver based fibrous threads being electrically connected a first wall plug;
   said plurality of conductive textile sewing threads and said plurality of silver based fibrous threads being in electrical contact with said patch of conductive sewing threads;
   said patch of conductive sewing threads being mounted into said multilayered textile cover by said male end;
   said male end being detachably engaged to a female end;
   said female end being electrically connected to said first wall plug through said insulated wire;
   said mattress being enclosed by said removable mattress cover;
   said multilayered textile cover being positioned onto and across said mattress;
   a hook-and-loop-fastening strap assembly;
   a fabric handle assembly;
   said hook-and-loop-fastening strap assembly being laterally connected to said removable mattress cover;
   said fabric handle assembly being laterally connected to said multilayered textile cover;
   said hook-and-loop-fastening strap assembly being looped through and removably secured to said fabric handle assembly; and
   said multilayered textile cover being secured on said mattress cover by a first zipper assembly.

2. The sleep enhancement bed system as claimed in claim 1 comprises:
   a foundation;
   said foundation being positioned adjacent said mattress, opposite to said multilayered textile cover; and
   said mattress being mounted onto said foundation.

3. The sleep enhancement bed system as claimed in claim 1, wherein said removable mattress cover being sealed over said mattress by a second zipper assembly.

4. A sleep enhancement bed system comprises:
   a multilayered textile cover;
   said multilayered textile cover comprises a stimulus responsive textile, a substrate, a plurality of conductive textile sewing threads, and a plurality of silver based fibrous threads;
   said stimulus responsive textile being evenly distributed through said substrate;
   said plurality of conductive textile sewing threads being evenly distributed through said substrate;
   said plurality of silver based fibrous threads being evenly distributed through said substrate;
   said plurality of conductive textile sewing threads and said plurality of silver based fibrous threads being electrically connected to a first wall plug;
   a patch of conductive sewing threads;
   an electrically conductive rivet;
   an insulated wire;
   said electrically conductive rivet comprises a male end and a female end;
   said plurality of conductive textile sewing threads and said plurality of silver based fibrous threads being in electrical contact with said patch of conductive sewing threads;

said patch of conductive sewing threads being mounted into said multilayered textile cover by said male end;
said male end being detachably engaged to a female end;
said female end being electrically connected to said first wall plug through said insulated wire;
an inline fast-blow fuse is electrically integrated into said insulated wire between said female end and said first wall plug;
an air chamber;
an air pump;
an air-pressure remote control;
said air chamber being located in between said multilayer bed cover and a mattress;
said air pump being in fluid communication with said air chamber;
said air-pressure remote control being electronically connected to said air pump;
an air hose;
a hose mounting assembly;
said air pump being in fluid communication with said air chamber through said air hose;
said air hose being hermetically connected to said air chamber by said hose mounting assembly;
said air pump being electrically connected to a second wall plug through a second wire assembly; and
the multilayered textile cover conductively connects to an electrical ground via a conductive textile.

5. The sleep enhancement bed system as claimed in claim 4 comprises:
a removable mattress cover;
a mattress;
said mattress being enclosed by said removable mattress cover; and
said multilayered textile cover being positioned onto and across said mattress.

6. The sleep enhancement bed system as claimed in claim 5 comprises:
a hook-and-loop-fastening strap assembly;
a fabric handle assembly;
said hook-and-loop-fastening strap assembly being laterally connected to said removable mattress cover;
said fabric handle assembly being laterally connected to said multilayered textile cover; and
said hook-and-loop-fastening strap assembly being looped through and removably secured to said fabric handle assembly.

7. The sleep enhancement bed system as claimed in claim 5, said multilayered textile cover being secured on said mattress cover by a first zipper assembly.

8. The sleep enhancement bed system as claimed in claim 5, wherein said removable mattress cover being sealed over said mattress by a second zipper assembly.

9. The sleep enhancement bed system as claimed in claim 5 comprises:
a foundation;
said foundation being positioned adjacent said mattress, opposite to said multilayered textile cover; and
said mattress being mounted onto said foundation.

10. The sleep enhancement bed system as claimed in claim 4 comprises:
an air chamber;
an air pump;
an air-pressure remote control;
said air chamber being located in between said multilayer bed cover and a mattress;
said air pump being in fluid communication with said air chamber; and
said air-pressure remote control being electronically connected to said air pump.

11. The sleep enhancement bed system as claimed in claim 10 comprises:
an air hose;
a hose mounting assembly;
said air pump being in fluid communication with said air chamber through said air hose; and
said air hose being hermetically connected to said air chamber by said hose mounting assembly.

12. The sleep enhancement bed system as claimed in claim 10, said air pump being electrically connected to a second wall plug through a second wire assembly.

* * * * *